US009114876B1

(12) United States Patent
Cockell, II

(10) Patent No.: US 9,114,876 B1
(45) Date of Patent: Aug. 25, 2015

(54) QUICK ROPE ASSISTED DEPLOYMENT AND EXTRACTION APPARATUS

(71) Applicant: AIR RESCUE SYSTEMS CORPORATION, Ashland, OR (US)

(72) Inventor: Robert C. Cockell, II, Ashland, OR (US)

( * ) Notice: Subject to any disclaimer, the term of this patent is extended or adjusted under 35 U.S.C. 154(b) by 215 days.

(21) Appl. No.: 13/835,765

(22) Filed: Mar. 15, 2013

(51) Int. Cl.
*B64D 9/00* (2006.01)

(52) U.S. Cl.
CPC ........................................ *B64D 9/00* (2013.01)

(58) Field of Classification Search
CPC .............................. B64D 9/00; B64D 2009/00
USPC ...................... 244/137.1, 137.2, 137.4, 118.1
See application file for complete search history.

(56) References Cited

U.S. PATENT DOCUMENTS 2,569,628 A * 10/1951 Craighead et al. .............. 52/120
2,930,495 A * 3/1960 Matheisel ................. 414/137.2
2,953,330 A 9/1960 Lysak
3,358,968 A 12/1967 Walsh et al.
3,782,319 A * 1/1974 Hale ............................ 114/244
3,838,836 A * 10/1974 Asseo et al. ............... 244/137.4
4,252,491 A * 2/1981 Hock ........................... 414/540
5,158,247 A 10/1992 Ferrier
5,190,250 A 3/1993 DeLong et al.
5,209,435 A * 5/1993 Edwards .................... 244/137.2
5,762,297 A * 6/1998 Ascherin et al. ........... 244/137.1
5,788,186 A 8/1998 White
6,334,590 B1 * 1/2002 Landry ...................... 244/137.1
6,533,220 B2 3/2003 Schuster
6,598,831 B1 * 7/2003 Tardy ......................... 244/137.2
7,216,740 B2 5/2007 Dierkes et al.
8,602,393 B1 * 12/2013 Huffman ....................... 254/323
2003/0222177 A1 * 12/2003 Bonisch ..................... 244/137.1
2009/0146010 A1 * 6/2009 Cohen ........................ 244/137.1
2010/0044156 A1 2/2010 Tkebuchava
2011/0147531 A1 * 6/2011 Bosqueiro et al. ......... 244/137.1

* cited by examiner

*Primary Examiner* — Timothy D Collins
*Assistant Examiner* — Christopher Hutchens
(74) *Attorney, Agent, or Firm* — Jerry Haynes Law

(57) ABSTRACT

A rapid personnel deployment/extraction rope assisting apparatus for an aircraft includes at least one deployment rope support assembly including a main support member adapted for installation in the aircraft, an assembly arm carried by the main support member and a rope securing mechanism carried by the assembly arm, the rope securing mechanism adapted to secure a rapid personnel deployment/extraction rope/cable to the assembly arm.

17 Claims, 5 Drawing Sheets

QUICK ROPE ASSISTED DEPLOYMENT AND EXTRACTION APPARATUS

FIELD OF THE INVENTION

Illustrative embodiments of the disclosure are generally directed to rapid personnel (deployment and extraction) ropes for aircraft. More particularly, illustrative embodiments of the disclosure are directed to a rapid personnel quick rope assisted deployment and extraction apparatus which is readily installable in an aircraft and enables simultaneous rapid deployment and a fixed line extraction of one or more persons from the aircraft.

BACKGROUND OF THE INVENTION

Fast-roping or rappelling is frequently used in military and civilian applications to rapidly deploy personnel from an aircraft to a location below the aircraft. Fast-roping typically involves repelling down a rope which is suspended from a support frame in a helicopter. The personnel may descend the rope either by gripping the rope or by using a brake-assisted descent mechanism. Under some circumstances, such as in various military exercises, for example, deployment of multiple persons in rapid succession from the aircraft to the accessed location may be necessary.

Therefore, a quick rope assisted deployment and extraction apparatus which is readily installable in an aircraft and enables simultaneous rapid deployment of one or more persons from the aircraft may be desirable for some applications. This apparatus may also be used to extract one or more persons connected to a fixed line. Lifting cargo on a fixed line may also be used.

SUMMARY OF THE INVENTION

Illustrative embodiments of the disclosure are generally directed to a rapid personnel deployment and extraction rope assisting apparatus for an aircraft. An illustrative embodiment of the apparatus includes at least one deployment rope support assembly including a main support member adapted for installation in the aircraft, an assembly arm carried by the main support member and a rope securing releasable/mechanism carried by the assembly arm, the rope securing mechanism adapted to secure a rapid deployment or extraction rope to the assembly arm.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "front" and "rear" are intended for descriptive purposes only and are not to be construed in a limiting sense as the rapid personnel deployment rope assisting apparatus may be amenable to applications in other orientations or positions.

Figure 4:
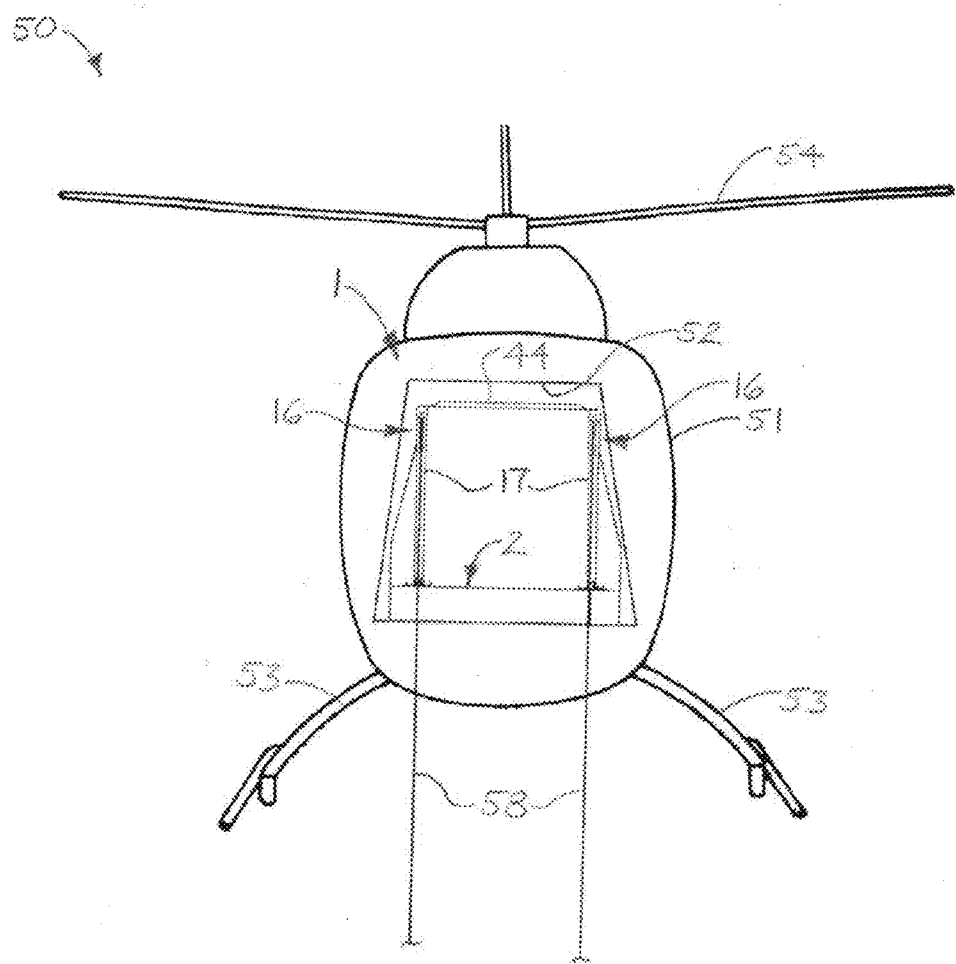
FIG. 4 is a rear view of a helicopter, with an illustrative embodiment of the quick rope assisted deployment and extraction apparatus in the interior of the helicopter and a pair of rapid personnel deployment ropes attached to the apparatus and suspended from the helicopter in exemplary application of the apparatus.

Referring to the drawings, an illustrative embodiment of the quick rope assisted deployment and extraction apparatus, hereinafter apparatus, is generally indicated by reference numeral 1. As illustrated in FIG. 4 and will be hereinafter further described, the apparatus 1 is adapted for installation in an aircraft 50 such as a helicopter. The apparatus 1 facilitates suspension of one or more rapid personnel deployment ropes 58 from the aircraft 50 to enable one or multiple operators to fast-rope or rappel down the rapid personnel deployment rope or ropes 58 to a location beneath the aircraft 50. The various components of the apparatus 1 can be fabricated using aluminum, carbon fiber composite, stainless steel, any combination thereof or other materials which are consistent with the functional requirements of the apparatus 1. In exemplary application, which will be hereinafter described, the apparatus 1 may be mounted on an aircraft floor 2 and attached to an aircraft sidewall 10 of the aircraft 50 using existing OEM attachment points.

At least one deployment rope support assembly 16 is mounted to the aircraft floor 2 of the aircraft 50. In some embodiments, a pair of deployment rope support assemblies 16 may be provided adjacent, spaced-apart relationship to each other. A walk surface 5 extends between the deployment rope support assemblies 16. Each deployment rope support assembly 16 may include a generally elongated main support member 17 which is upward-standing any length from the walk surface 5. A main support member foot 18 may attach the main support member 17 to the aircraft floor 2. An assembly arm 19 is supported by the main support member 17. The assembly arm 19 may be generally elongated, with a rear arm end 20 and a front arm end 21 which is oriented towards the front end of the aircraft floor 2. This assembly arm 19 may also be mounted out either side of the aircraft 50. The assembly arm 19 may be generally perpendicular to the main support member 17. The assembly arms 19 of the respective deployment rope support assemblies may be disposed beneath the ceiling of the aircraft 50.

Figure 1:
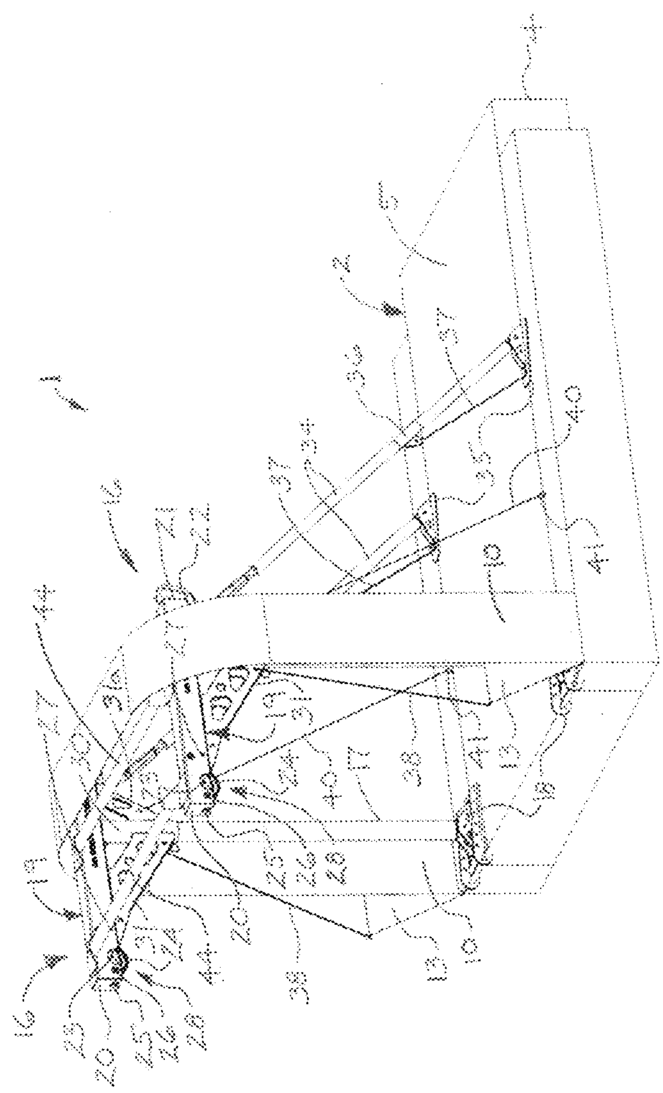
FIG. 1 is a rear perspective view of an illustrative embodiment of the quick rope assisted deployment and extraction apparatus mounted on an aircraft floor and to the aircraft sidewall (partially in section) of an aircraft in exemplary application of the apparatus.
Figure 2:
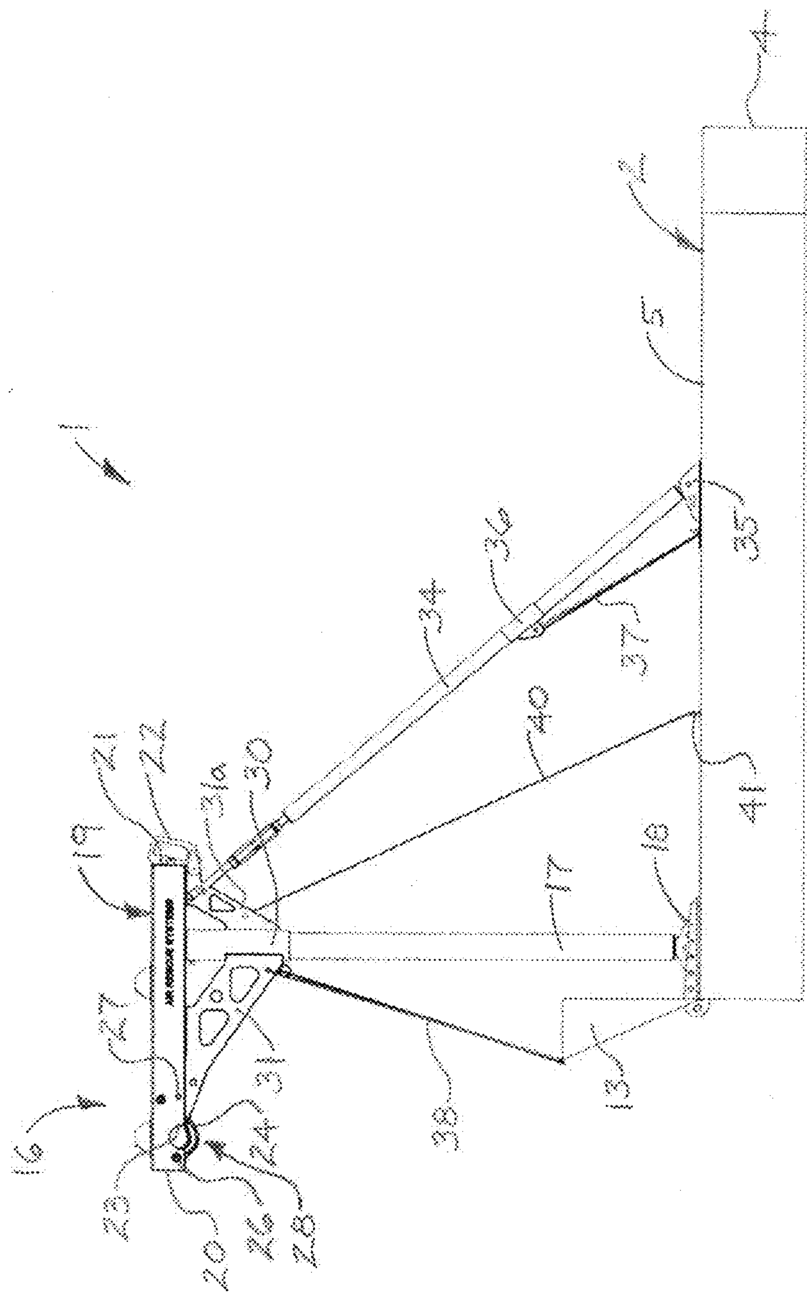
FIG. 2 is a side view of an illustrative embodiment of the quick rope assisted deployment and extraction apparatus mounted on an aircraft floor.
Figure 3:
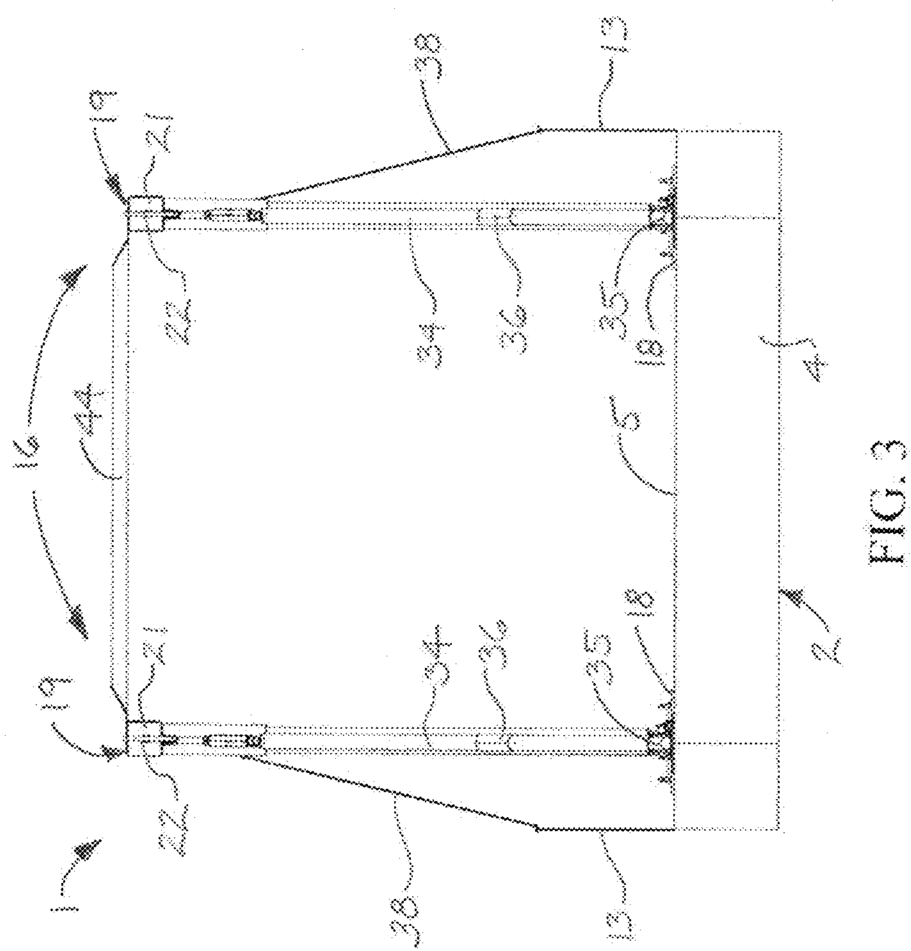
FIG. 3 is a forward facing view of an illustrative embodiment of the quick rope assisted deployment and extraction apparatus mounted on an aircraft floor (partially in section)

In some embodiments, an assembly arm collar 30 may extend downwardly from the assembly arm 19. The assembly arm collar 30 receives and accommodates the upper end of the main support member 17. In some embodiments, the assembly arm collar 30 may be attached to the main support member 17 via pins, mechanical fasteners, welding and/or other suitable attachment technique. A rear arm brace 31 and a front arm brace 31*a* may extend between the assembly arm 19 and the assembly arm collar 30 for reinforcement purposes. In some embodiments, at least one assembly arm connecting cross member 44 (FIG. 1) may connect the assembly arms 19 to each other. A handle 22 may be provided at the front arm end 21 of the assembly arm 19 of each deployment rope support assembly 16.

In some embodiments, a tensioned rear side anchor cable/link 38 may attach to and extend between the rear arm brace 31 and an aircraft wall mount 13. The rear-side anchor cable 38 maintains a downward tension/compression of the assembly arm collar 30 on the main support member 17. A tensioned front anchor cable 40 may attach to and extend between the front arm brace 31*a* and the floor 2. The front anchor cable 40 may attach to a cable attachment hook 41 which is threadably or otherwise attached to the aircraft floor 2. The front anchor cable 40 exerts a forward tension on the assembly arm 19 and reinforces the load-bearing capacity of the assembly arm 19.

In some embodiments, a brace member 34 may angle from the assembly arm 19 to the aircraft floor 2. A brace member foot 35 may attach the brace member 34 to the OEM mount location(s) to the aircraft floor 2. In some embodiments, the brace member 34 may be pivotally attached to the brace member foot 35. An anchor cable collar 36 may be provided on the brace member 34. A tensioned tensioning cable or link 37 may attach to and extend between the brace member foot 35 and the anchor cable collar 36. The tensioning cable or link 37 causes the brace member 34 to exert a forward tension on the assembly arm 19 and reinforces the load-bearing capacity of the assembly arm 19.

Figure 5:
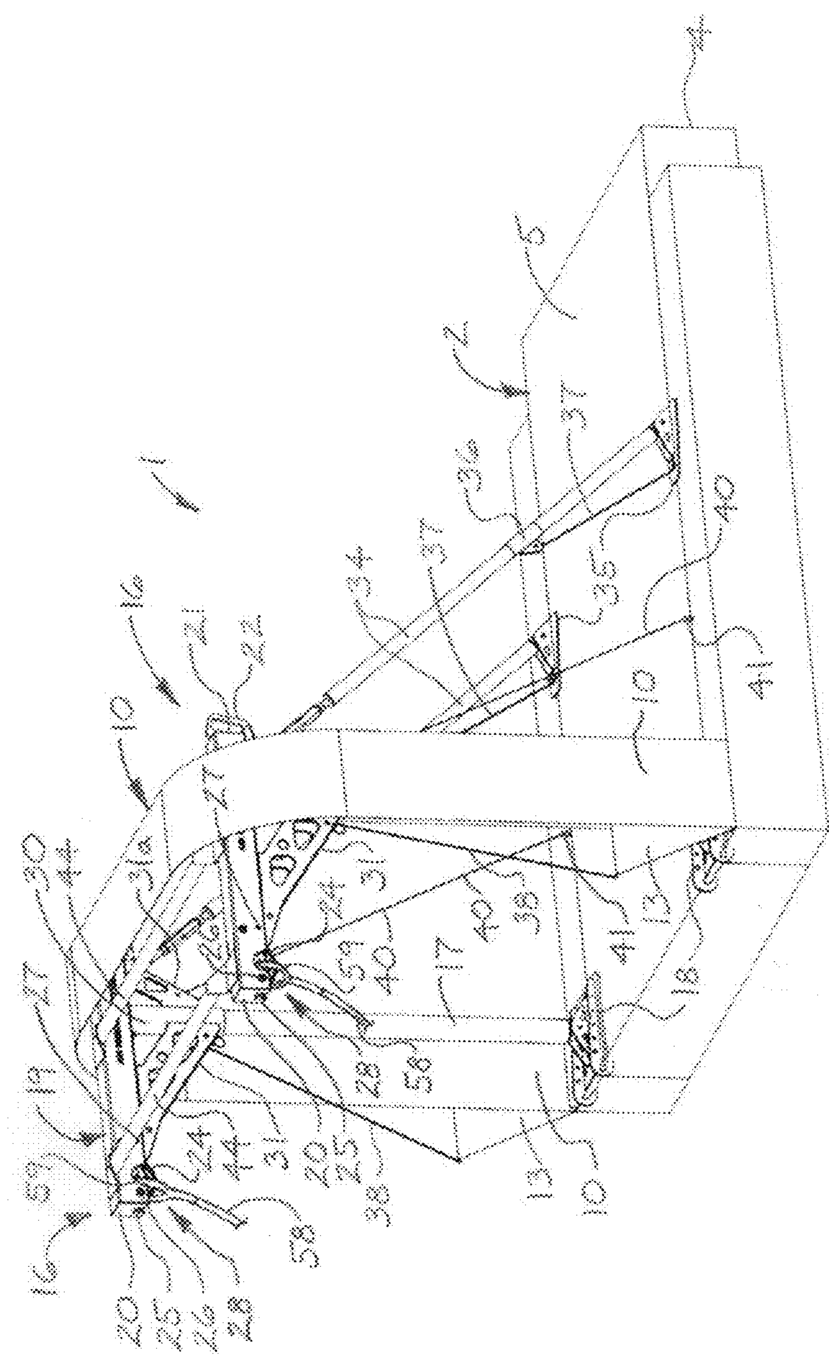
FIG. 5 is a rear perspective view of an illustrative embodiment of the quick rope assisted deployment and extraction apparatus mounted on an aircraft floor and an aircraft sidewall (partially in section), with a pair of rapid personnel deployment ropes (partially in section) attached to the apparatus in exemplary application.

A rope securing mechanism 28 is provided on the assembly arm 19. The rope securing mechanism 28 may include any type of mechanism which is suitable for attaching the rapid personnel deployment rope 58 to the assembly arm 19 in a secure manner. As used herein, “rapid personnel deployment rope” includes but is not limited to a rope, cable, line or wire. In some embodiments, the rope securing mechanism 28 may include a rope clearance opening 23 which is provided in the underside of the assembly arm 19 generally adjacent to the rear arm end 20. A rope attachment member 24 may be provided on the assembly arm 19 at the rope clearance opening 23. The rope attachment member 24 may be pivotally or slidably attached to the assembly arm 19, via a rope attachment member pivot pin 26, at a rope attachment member slot 25 to selectively open and close the rope clearance opening 23. A release mechanism attached to handle 22 to open rope attachment 24 may have a member lock 27 that can be detached/or selectively locked so that handle 22 can be pulled to release attachment 24. Accordingly, as illustrated in FIG. 5, in some applications of the apparatus 1, the rapid personnel deployment/extraction rope 58 may terminate in a loop 59 which engages the rope attachment member 24 to securely attach the rapid personnel deployment/extraction rope 58 to the assembly arm 19. The rope attachment member 24 may be unlocked via the rope attachment member lock 27 and pivoted at the rope attachment member pivot 26 to open the rope attachment member 24 and facilitate placement of the loop 59 around the rope attachment member 24. The rope attachment member 24 may be pivoted and locked in place to secure the loop 59 to the rope attachment member 24 as the loop 59 extends through the rope clearance opening 23. In other embodiments, the rapid personnel deployment rope 58 may be attached to the rope attachment member 24 via a hook, clamp/ring or other mechanical device which is suitable for the purpose.

Referring next to FIG. 4 of the drawings, in exemplary application, the apparatus 1 is installed in an aircraft 50 such as an MI-8 or an MI-17 helicopter, for example and without limitation. The aircraft 50 may include a fuselage 51 with a rear opening 52, runners 53 and a rotor 54. The apparatus 1 is installed in the aircraft 50 facing the rear or opening 52, at the rear of the fuselage 51 and the front end 4 of the aircraft floor 2 facing the front end of the fuselage 51. The deployment rope support assemblies 16 may be installed to the aircraft floor 2 and the aircraft sidewall 10 using existing OEM fixture attachment points (not illustrated) for the main support member feet 18, the brace member feet 35 and the cable attachment hooks 41. A pair of rapid personnel deployment ropes 58 is attached to the assembly arms 19 of the respective deployment rope support assemblies 16 typically as was heretofore described with respect to FIG. 5.

The aircraft 50 is maneuvered over a target location (not illustrated) to which multiple operators are to be rapidly deployed via the rapid personnel deployment ropes 58. The rapid deployment ropes 58 are suspended from the apparatus 1 through the rear or side opening 52 of the aircraft 50. Each operator who is to descend one of the rapid deployment/extraction ropes 58 initially walks on the walk surface 5 of the aircraft floor 2 between the deployment rope support assemblies 16. That operator will deploy out of the aircraft 50 using the apparatus 1 to help guide himself or herself safely to the intended target location. Once all personnel are off the rapid deployment rope 58, one of the remaining personnel in the aircraft grasps the handle 22 on the assembly arm 19 with one hand and then releases the handle 22 to drop the rapid deployment rope 58. The operator then descends the rapid deployment rope 58 to the target location by either fast roping down the rope 58 using his or her hands or using a brake-assisted descent (rappelling) mechanism known by those skilled in the art and releases the rope 58 or mechanism to conduct the operation. Multiple operators may successively descend each rapid deployment rope 58 in like manner to provide sufficient personnel for the operation. In some embodiments, the dual deployment rope support assemblies 16 of the apparatus 1 enables two operators to simultaneously descend each rope to facilitate rapid deployment of the personnel for the operation.

It will be appreciated by those skilled in the art that the apparatus 1 enables operators to rapidly descend the rapid deployment ropes 58 using any of a variety of techniques which are known for the purpose. For example, in some applications, each operator can use a bare-handed technique (fast roping) to slide down a rapid deployment rope 58. In other applications, each rapid deployment rope 58 may be a traditional rappel line in which each operator uses a brake-assisted descent mechanism fitted with a harness to insert from the aircraft 50 to the target location. In some applications, the rapid personnel deployment ropes 58 may be used to lower cargo, gear or equipment from the hovering aircraft 50 to the target location. Extraction methods may also be used.

It will be appreciated by those skilled in the art that the apparatus 1 can be readily installed in an aircraft 50 without the need to modify the airframe of the aircraft 50. The deployment rope support assemblies 16 can be installed using six (6) internal OEM aircraft anchor points in as little as 10 minutes. The rear "clam-shell" doors of the aircraft 50 can be re-installed and secured with the apparatus 1 in the operations position. Rear ingress/egress of the aircraft 50 is not limited by installation of the apparatus 1. The apparatus 1 can be installed and used with internal AUX fuel tanks installed. The apparatus 1 requires minimal use of cargo space and does not interfere with aircraft controls.

While the illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A rapid personnel deployment rope assisting apparatus for an aircraft, comprising:
- a pair of spaced-apart deployment rope support assemblies adapted for attachment to an aircraft floor on respective sides of a walk surface, each of the deployment rope support assemblies including:
- a main support member carried by the aircraft floor;
- an assembly arm carried by the main support member;
- a rope securing mechanism carried by the assembly arm, the rope securing mechanism adapted to secure a rapid personnel deployment rope to the assembly arm; and
- an assembly arm collar extending downwardly from the assembly arm, the assembly arm collar adapted to receive and accommodate the upper end of the main support members;

wherein the rope securing mechanism comprises a rope clearance opening in the assembly arm and a rope attachment member carried by the assembly arm, the rope attachment member closeable over the rope clearance opening.

2. The apparatus of claim 1 further comprising an angled brace member carried by the floor, and wherein the assembly arm is carried by the brace member.

3. The apparatus of claim 1 further comprising a tensioned front anchor cable/link engaging the assembly arm.

4. The apparatus of claim 3 further comprising a front arm brace extending generally between the assembly arm and the main support member, and wherein the front anchor cable attaches to the front arm brace and is adapted for attachment to the aircraft floor.

5. The apparatus of claim 3 further comprising a tensioned rear anchor cable engaging the assembly arm.

6. The apparatus of claim 5 further comprising a rear arm brace extending generally between the assembly arm and the main support member, and wherein the rear anchor cable/link attaches to the rear arm brace.

7. The apparatus of claim 6 wherein the rear anchor cable attaches to the rear arm brace and is adapted for attachment to a side wall of the aircraft.

8. A rapid personnel deployment rope assisting apparatus for an aircraft, comprising:
- a pair of spaced-apart deployment rope support assemblies adapted for attachment to an aircraft floor of the aircraft, each of the deployment rope support assemblies including:
- a main support member adapted for attachment to the aircraft floor;
- a removable assembly arm collar carried by the main support member;
- an assembly arm carried by the assembly arm collar;
- a rope securing mechanism carried by the assembly arm, the rope securing mechanism adapted to secure a rapid deployment/extraction rope to the assembly arm;
- a front arm brace extending between the assembly arm and the assembly arm collar;
- a rear arm brace extending between the assembly arm and the assembly arm collar;
- an angled brace member carried by the floor, the brace member engaging the assembly arm;
- a tensioned front anchor cable attached to the front arm brace and adapted for attachment to the aircraft floor; and
- a tensioned rear anchor cable/link attached to and extending between the rear arm brace and the a side wall of the aircraft wherein the rope securing mechanism comprises a rope clearance opening in the assembly arm and a rope attachment member carried by the assembly arm, the rope attachment member closeable over the rope clearance opening.

9. The apparatus of claim 8 further comprising a tensioned tensioning cable/link attached to the brace member and adapted for attachment to the aircraft floor.

10. The apparatus of claim 8 further comprising at least one assembly arm connecting member connecting the deployment rope support assemblies to each other.

11. A rapid personnel deployment rope assisting apparatus for an aircraft, comprising:
- at least one deployment rope support assembly including:
- a main support member adapted for installation in the aircraft;
- an assembly arm carried by the main support member;
- a rope securing mechanism carried by the assembly arm, the rope securing mechanism adapted to secure a rapid deployment rope to the assembly arm; and
- a rope clearance opening in the assembly arm and a rope attachment member carried by the assembly arm, the rope attachment member closeable over the rope clearance opening.

12. The apparatus of claim 11 further comprising an angled brace member, and wherein the assembly arm is carried by the brace member.

13. The apparatus of claim 11 further comprising a tensioned front anchor cable/link engaging the assembly arm.

14. The apparatus of claim 13 further comprising a front arm brace extending generally between the assembly arm and the main support member, and wherein the front anchor cable attaches to the front arm brace.

15. The apparatus of claim 13 further comprising a tensioned rear anchor cable engaging the assembly arm.

16. The apparatus of claim 15 further comprising a rear arm brace extending generally between the assembly arm and the main support member, and wherein the rear anchor cable attaches to the rear arm brace.

17. The apparatus of claim 16 wherein the rear anchor cable attaches to the rear arm brace and is adapted for attachment to an aircraft sidewall of the aircraft.

* * * * *